United States Patent
Neel et al.

(10) Patent No.: US 11,623,792 B2
(45) Date of Patent: Apr. 11, 2023

(54) METALLOPLASTIC STRIP FOR RIGID FOOD PACKAGING AND MANUFACTURING METHOD

(71) Applicant: CONSTELLIUM NEUF-BRISACH, Biesheim (FR)

(72) Inventors: Olivier Neel, La Murette (FR); Alain Vassel, Saint Etienne de Crossey (FR); Bernard Grindatto, Pont en Royans (FR)

(73) Assignee: CONSTELLIUM NEUF-BRISACH, Biesheim (FR)

( * ) Notice: Subject to any disclaimer, the term of this patent is extended or adjusted under 35 U.S.C. 154(b) by 584 days.

(21) Appl. No.: 16/301,676

(22) PCT Filed: May 15, 2017

(86) PCT No.: PCT/FR2017/051166
§ 371 (c)(1),
(2) Date: Nov. 14, 2018

(87) PCT Pub. No.: WO2017/198936
PCT Pub. Date: Nov. 23, 2017

(65) Prior Publication Data
US 2019/0291924 A1     Sep. 26, 2019

(30) Foreign Application Priority Data
May 20, 2016  (FR) ...................................... 1654562

(51) Int. Cl.
*B65D 25/14*    (2006.01)
*B29C 48/154*   (2019.01)
(Continued)

(52) U.S. Cl.
CPC .............. *B65D 25/14* (2013.01); *B05D 1/265* (2013.01); *B05D 3/0254* (2013.01); *B05D 3/12* (2013.01);
(Continued)

(58) Field of Classification Search
CPC ..... B65D 25/14; B29C 48/154; B29C 48/914; B29C 48/21; B05D 1/265; B05D 3/0254;
(Continued)

(56) References Cited

U.S. PATENT DOCUMENTS 5,149,389 A * 9/1992 Heyes ..................... B32B 15/08
156/272.4
5,407,702 A * 4/1995 Smith .................... B05D 1/265
156/229
(Continued)

FOREIGN PATENT DOCUMENTS

| WO | 2006045017 A1 | 4/2006 |
| WO | 2011009024 A1 | 1/2011 |
| WO | 2013143628 A1 | 10/2013 |

OTHER PUBLICATIONS

Jonn Kaurman, ntroducton to Aluminum Alloys and Tempers, 2000, ASM International, Chapter 2 (pp. 9-22) (Year: 2000).*

(Continued)

*Primary Examiner* — Francisco W Tschen
*Assistant Examiner* — Abhishek A Patwardhan
(74) *Attorney, Agent, or Firm* — McBee Moore & Vanik IP, LLC (57) ABSTRACT

The purpose of the invention is a method for coating a substrate made of an aluminum alloy in the AA3000 or AA5000 series, comprising the following steps:
a) coating by (co-)extrusion of a polypropylene modified by maleic anhydride adhesion layer on each face of said substrate, and a surface layer made of polypropylene comprising at least one slip agent, so as to form a metalloplastic strip;

(Continued)

b) calendering said metalloplastic strip;
c) heat treatment of said metalloplastic strip;
d) cooling of the metalloplastic strip, to obtain an H48 metallurgical temper and a coefficient of friction of 0.06 or less. The method being particularly suitable for the fabrication of food packaging and particularly for beverage can lids.

19 Claims, 3 Drawing Sheets (51) Int. Cl.
  B29C 48/88 (2019.01)
  B29C 48/21 (2019.01)
  B05D 1/26 (2006.01)
  B05D 3/02 (2006.01)
  B05D 3/12 (2006.01)
  B32B 37/08 (2006.01)
  B32B 37/15 (2006.01)
  B32B 38/00 (2006.01)
  B32B 38/12 (2006.01)
  C09D 123/12 (2006.01)

(52) U.S. Cl.
  CPC ...... B05D 2202/25 (2013.01); B05D 2252/10 (2013.01); B29C 48/154 (2019.02); B29C 48/21 (2019.02); B29C 48/914 (2019.02); B32B 37/08 (2013.01); B32B 37/153 (2013.01); B32B 38/0036 (2013.01); B32B 38/12 (2013.01); B32B 2309/105 (2013.01); B32B 2311/24 (2013.01); B32B 2323/10 (2013.01); B32B 2439/66 (2013.01); C09D 123/12 (2013.01)

(58) Field of Classification Search
  CPC .. B05D 3/12; B05D 2202/25; B05D 2252/10; B32B 37/08; B32B 37/153; B32B 38/0036; B32B 38/12; B32B 2309/105; B32B 2311/24; B32B 2323/10; B32B 2439/66; C09D 123/12; C08L 83/04
  USPC .................................................... 156/244.11
  See application file for complete search history.

(56) References Cited

U.S. PATENT DOCUMENTS

| | | | |
|---|---|---|---|
| 5,919,517 A * | 7/1999 | Levendusky | B05D 1/265 427/211 |
| 6,623,797 B2 * | 9/2003 | Avalos | B32B 15/08 427/398.1 |
| 2001/0009718 A1 * | 7/2001 | Sinsel | B32B 38/0008 428/332 |
| 2003/0152788 A1 * | 8/2003 | Velliky | B29C 48/919 428/457 |
| 2015/0079411 A1 * | 3/2015 | Nummila-Pakarinen | B32B 15/085 428/450 |
| 2015/0202843 A1 * | 7/2015 | Siemen | B05D 1/265 428/141 |

OTHER PUBLICATIONS

International Search Report of International Patent Application No. PCT/FR2017/051166 dated Sep. 29, 2017.
Search Report of French Patent Application No. 1654562 dated Jan. 30, 2017.

* cited by examiner

METALLOPLASTIC STRIP FOR RIGID FOOD PACKAGING AND MANUFACTURING METHOD

CROSS-REFERENCE TO RELATED APPLICATIONS

This application is a National Stage entry of International Application No. PCT/FR2017/051166, filed 15 May 2017, which claims priority to French Patent Application No. 1654562, filed 20 May 2016.

BACKGROUND

Field

The invention relates to the domain of metalloplastic strips made of an aluminum alloy used for the preparation of rigid food packagings and more particularly for the domain of beverage can lids. The invention also applies to a method of preparation of metalloplastic strips obtained by co-extrusion on an aluminum alloy substrate.

Description of Related Art

Metal strips used for the manufacturing of rigid food packagings are usually made by applying liquid varnish on an aluminum alloy strip. This liquid varnish is then dried or baked to obtain a coating.

Varnishes used at the present time have complex chemical compositions that are once again modified by baking and drying operations. Moreover, these drying or baking steps significantly alter the mechanical properties of the aluminum alloy substrate.

In the special case of beverage can lids, additional constraints imposed by food manufacturers require shaping operations without the use of external lubrication applied on the varnish. The reason given is related to the harmful nature of these lubricants on working properties of some products. One of these harmful properties relates to the ability of beer to form a stable and abundant foam.

The harmlessness to consumer health of some components such as traces of precursors or reaction by-products is questioned regularly by various studies (1) (2) (3) and as a result the regulations in force have been changed, leading to the replacement of food packagings by new generation packagings.

One alternative to the varnished packagings used to manufacture drink can lids consists of replacing the varnish by a polymer coating. This solution that was used in the past by Crown and Hoogovens (4) consists of forming a metalloplastic complex obtained by depositing a polyethylene terephthalate (PET) film on an aluminum alloy strip.

Despite its advantages, this method suffers from the disadvantage that it uses external lubrication based on paraffin derivatives for manufacturing of beverage can lids.

In the same way, the Toyo Seikan company uses complexing of aluminum and PET films (4) (5) for the fabrication of beverage can bodies. However, products obtained using this method have not been developed commercially. It would be difficult to transform them and for example would require external lubrication and would therefore not be very suitable for the manufacturing of beverage can lids.

Coated products obtained by extrusion of polypropylene, PP, on metal exist industrially, but in application fields other than rigid food packagings. Thick polymer films of the order of several mm thick, are used for applications in architecture; while thin deposit on metal, less than 100 μm thick, is usually used for the fabrication of flexible packagings.

None of these products can be shaped afterwards, as is the case in the field of rigid packaging, particularly for the fabrication of beverage can lids for which high speed stamping operations are necessary, of the order of 100 strokes per minute or more on presses.

It is known from application WO 2013/143628 A1, Borealis AG, that metalloplastic strips can be used for the preparation of food packagings. These metalloplastic strips are obtained for example by coating a first adhesion layer composed of PP modified by maleic anhydride and a second PP surface layer containing non-migrating slip agents and blocking agents, on an aluminum alloy substrate. However, the hardness properties and the thickness of the metal and the coating and the adhesion, roughness and friction properties of the metalloplastic strip make it impossible to use it industrially to prepare beverage can lids.

Preparation of the beverage can lid is only possible if all these parameters are precisely controlled so that the metalloplastic strip can be transformed in fabrication lines without the manufacturer needing to make any significant modifications, in other words other than routine adjustments, on customer manufacturing tools and without making use of external lubrication deposited on the coating after its application.

Figure 4:
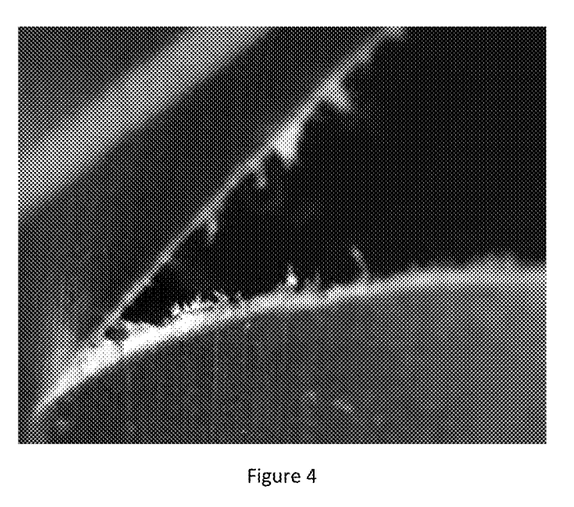
FIG. 4 illustrates the imperfect break in the film and associated polymer filaments or "crazing".

A second important criterion consists of obtaining a clean break of the film when the lid is opened. This clean break is only possible if a judicious compromise can be obtained between flexibility of the coating required for shaping operations, and the necessary brittleness so that opening the incision causes a clean break in the coating. FIG. 4 illustrates the phenomenon related to an imperfect break of the polymer film, due to its plasticity.

At the present time, no substitution coating has been developed for the fabrication of a rigid metallic packaging, and even more so has not been satisfactorily industrialized. No manufacturer has successfully developed a technology adapted to the preparation of rigid food packagings, particularly beverage can lids, without making use of external solvents and lubricants.

There is also an unsatisfied need in the packaging industry for an improved packaging adapted to constraints of industrial processes for the easily industrializable fabrication of rigid metallic packagings such as beverage can lids, with better performances than varnishes in terms of the environmental and sanitary footprint.

It will be noted that, in the following and unless mentioned otherwise, all aluminum alloys concerned are designated by the designations defined by the "Aluminum Association" in the "Registration Record Series" that it publishes regularly.

The definitions of the metallurgical tempers are indicated according to European standard EN 515.

SUMMARY

The inventors have found a solution to the needs mentioned above by disclosing a metalloplastic strip adapted to the constraints of fabricating rigid food packagings, particularly for the fabrication of lids for said packagings and more particularly for beverage can lids.

The metalloplastic strips according to the invention are obtained using a process for coating an aluminum alloy substrate with compositions based on polypropylene applied by co-extrusion, to obtain a coating with satisfactory properties for adhesion on the metallic substrate and lubrication properties.

The metalloplastic strips thus obtained are adapted to continuous manufacturing of rigid packaging lids, without the addition of any external lubrication and without any modifications of shaping tools other than an adjustment of the tools.

One of the purposes of the invention is thus a method of preparing metalloplastic strips obtained by applying a coating on an aluminum alloy substrate in the AA3000 or AA5000 series in the H19 or H39 metallurgical temper with a thickness of between 150 and 270 µm, preferably between 205 and 213 µm, comprising the following steps:

a) coating by (co-)extrusion at a temperature between 250 and 280° C. of a polypropylene modified by maleic anhydride adhesion layer on each face of said aluminum alloy substrate, and a surface layer made of polypropylene comprising at least one slip agent covering at least one of said adhesion layers so as to form a metalloplastic strip;

b) calendering of said metalloplastic strip to obtain a total thickness of the set of adhesion and surface layers with a thickness of between 4 and 20 µm per face; according to the most common mode, the thickness or polymers on the outside face is of the order of 5 to 15 µm, preferably 5 to 10 µm and preferably the thickness on the inside face is of the order of 5 to 15 µm;

c) heat treatment of said metalloplastic strip at a temperature comprised between 120 and 160° C. and preferably between 130 and 140° C.;

d) cooling of the metalloplastic strip, to obtain an H48 metallurgical temper and a coefficient of friction of 0.06 or less.

Optionally, the method may comprise a prior surface treatment step of the metallic substrate such as acid degreasing and/or phosphoric anodization and/or a chemical conversion before the application of coating layers. The best performances being obtained by the application of a phosphochromic conversion layer (6).

The metalloplastic obtained using the method according to the invention includes a sufficiently flexible applied coating that has very low surface roughness with excellent transformability. The coating also being sufficiently rigid to enable a clean break when the lid is opened. These properties, combined with the metallurgical temper of the metalloplastic strip, can obtain excellent formability properties making the metalloplastic strip according to the invention particularly attractive for subsequent shaping operations and for fabrication of beverage can lids.

Figure 2:
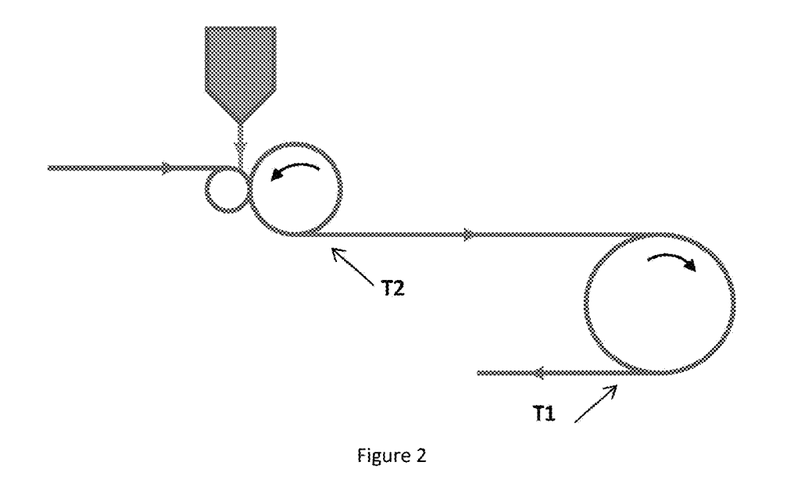
FIG. 2 represents a coating method according to the invention by co-extrusion on one face of the metal strip. In this method, the other face must be coated in a second step.
Figure 3:
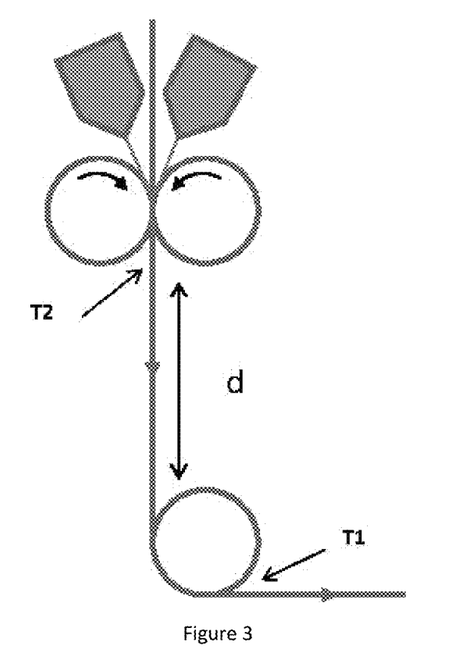
FIG. 3 represents the coating method according to the invention by co-extrusion on the two faces of the metal strip.

According to one embodiment of the invention, the distribution of adhesion and surface layers is practically identical, which can be obtained in practice by individual control of the material flow from each extruder feed screw (FIGS. 2 and 3).

According to one embodiment, the surface layer is applied on the two faces of the metalloplastic strip. According to one particularly advantageous embodiment, the surface layer includes anti-blocking agents chosen from the group containing silica, talc and aluminum silicates. Silica is particularly appreciated as an anti-blocking agent due to its properties. Preferably, the anti-blocking agent is used at a content of between 0.5 and 2% by weight of the composition of the surface layer.

Another purpose of the invention relates to a rigid food packaging element, or a beverage can lid, made from a metalloplastic strip like that mentioned above. The outside face of rigid food packagings corresponding to the face coated with an adhesive layer and the inner face in contact with the container, being coated with adhesion and surface layers.

DETAILED DESCRIPTION OF A PREFERRED EMBODIMENT

The inventors have developed a method for the fabrication of metalloplastic strips coated with a polymer material based on polypropylene deposited by co-extrusion. Said method can optimize the characteristics of metalloplastic strips so as to make them particularly suitable for the fabrication of rigid food packagings such as the fabrication of beverage can lids.

The method according to the invention may include an optional step before the coating step, for heat treatment of the metallic aluminum alloy strip to the H19 or H39 metallurgical temper or a preheating step to a temperature of between 40 and 120° C., or even better between 40 and 70° C. Preheating may be achieved by the use of an infrared radiation source as a heat source.

The preheating step is particularly useful because preheating does not modify the metallurgical temper of the metal strip, unlike heat treatment of the metalloplastic strip that could have a negative impact on the mechanical properties of the and product due to its thermal action on the metal.

The heat treatment or preheating of the metal strip makes it easier to unwind the metallic aluminum alloy strip and improve the quality of coating layers and particularly the quality of the surface coat. According to one hypothesis put forward by the inventors, preheating of the strip also contributes to better recrystallization of polypropylene in the coating layers and contributes to obtaining a better surface condition.

Step a) to coat polymer compounds on the surface of the metallic strip in the H19 or H39 metallurgical temper can be done with or without the use of external lubricants. However, it remains preferable not to use any external lubrication that could have a harmful effect on the characteristics of the packaged product. Coating is done by (co-)extrusion of a first adhesion layer composed essentially of polypropylene modified by maleic anhydride and applied at a temperature of between 250 and 280° C. The adhesion layer is applied on each face of the metallic substrate.

At the same time, a surface layer is applied by co-extrusion with the adhesion layer. The surface layer comprising polypropylene, a slip agent and possibly other additives.

The surface layer must be applied on the adhesion layer of at least one of the faces of the metalloplastic strip. This surface layer can also be applied on both faces of the metalloplastic strip. In the case illustrated in FIG. 2, two passes are necessary to obtain a coating on the two faces of the metallic strip. The calendering step b) is used to adjust the final thickness of the metalloplastic strip and to define the surface condition of the metalloplastic strip.

The heat treatment step c) maintains the temperature of the metalloplastic strip at a temperature T2 (FIGS. 2 and 3). The choice of the temperature and the temperature hold time is variable and depends on the metalloplastic strip and the embodiment. This step improves adhesion of the coating on the metallic substrate. The temperature of the metalloplastic strip is held at a moderate temperature, namely less than 200° C., typically of the order of 120 to 160° C. for a temperature hold time of between a few seconds and several minutes, typically less than 20 seconds and preferably from one to two seconds. It would appear that the surface condition degrades as a function of the heat treatment time. This step controls recrystallization of polypropylene and the migration of additives to the surface of the metalloplastic strip and contributes to improving the tribological properties of the metalloplastic surface and to reducing its coefficient of friction. According to one embodiment illustrated in FIG. 2, a device according to the invention is adapted such that the cooling cylinder is limited to bringing the temperature of the strip to a moderate sufficiently low temperature T2 to fix the surface, but sufficiently high to allow the adhesion layer to react. In a second embodiment illustrated in FIG. 3, simultaneous co-extrusion on the two faces thus minimizes the cooling time of the strip to temperature T2 at the exit from the thrust rollers.

The cooling step d) can thus be done in the open air or by quenching depending on the required cooling rate, so as to obtain the best surface condition, in other words without mottling on the strip revealing heterogeneous cooling, it is preferable to allow cooling in the open air. This device is illustrated in FIG. 2 in which cooling can be achieved by a roller to reduce the temperature of the strip to a final temperature T1. Cooling can also be achieved using a water quenching tank for final cooling of the metalloplastic strip thus obtained.

According to the embodiment illustrated in FIGS. 2 and 3, all that is necessary is to have a distance "d" between the exit from the rolls and the final cooling device adapted so that the temperature of the strip is reduced from temperature T2 to temperature T1, such that there is a sufficiently long time to achieve adhesion on the metallic strip when the production line is running at full speed.

Cooling by quenching in water does not significantly modify the values of the coefficient of friction of the metalloplastic strip and has the advantage that it prevents the polymer in the surface layer from adhering to the surface.

Subsequent to the heat treatment and cooling operations, the metalloplastic strip is in the H48 metallurgical temper as defined by European standard EN 515.

According to this standard, the H48 metallurgical temper is the temper of materials obtained after restoration and varnishing, and the H19 temper is the temper after simulation of baking corresponding to materials obtained after cold rolling and after simulation of baking of varnishes at 205° C. for 20 min.

In particular, the H48 metallurgical temper guarantees shaping of the metal to fabricate lids for beverage cans.

The method according to the invention enables industrial production of metalloplastic compounds with improved mechanical properties, or in which the metal is thinner for the same performance level as varnished metallic strips.

The metallic substrate used for the fabrication of metalloplastic strips is an AA3000 or AA5000 aluminum alloy strip with a thickness varying from 150 to 270 μm, preferably the substrate thickness varies between 150 and 230 μm, and even more preferably between 200 and 215 μm. In the case of canned food, the thickness is typically between 150 and 190 μm.

It is particularly difficult to obtain the H48 temper for a thickness between 200 and 215 μm using methods according to prior art. According to one particularly favored embodiment, the substrate is an AA3004, AA3104, AA3005, AA3207, AA5042, AA5052, AA5182, AA5052, AA5006, or AA3104215 aluminum alloy.

Beverage can lids made from the metalloplastic strip according to the invention have excellent characteristics in terms of adhesion of the polymer coating on the metal substrate, porosity of the coating, break of the film when the incision is opened, particularly with clean break conditions of the polymer coating composed of adhesion and surface layers.

For the purposes of this invention, the metalloplastic strip is a strip comprising a metal substrate, particularly made of aluminum alloy and comprising a coating on at least one of its faces applied by spreading, the coating being a polymer coating that corresponds to the adhesion layer and the surface layer, and at least one adhesion layer on the other face.

The adhesion layer is a layer applied directly on the metallic substrate made of an aluminum alloy. This layer can give good adhesion on the substrate and can also give good adhesion on the surface layer when it is applied by co-extrusion.

The adhesion layer is composed of a polypropylene resin modified by maleic anhydride. This compound can give satisfactory adhesion of the coating on the substrate. An example of a commercial product is OREVAC® 18751 (ARKEMA).

Polypropylene resins modified by maleic anhydride have the advantage that it is easy to extrude them on the aluminum alloy substrate. For example, this makes it easy to apply polypropylene resin modified by maleic anhydride directly onto the metallic substrate without the need for a special heat treatment. According to one embodiment, polypropylene resin modified by maleic anhydride can be applied on the hot metallic strip simply by delaying cooling of the metal strip. This eliminates the need for a heat treatment after application of the polymer coating by co-extrusion.

The surface layer is applied by co-extrusion with the adhesion layer onto the substrate surface. The surface layer forms a film to obtain a homogeneous and slightly rough coating on the surface of the metalloplastic complex. Examples of commercial polypropylene include WG350C (BOREALIS), Daploy™ WF420HMS, ADMER® Extrusion Coating Grades and particularly AT2059E-PP (MITSUI CHEMICALS) or MONTELL PF611 (LYONDELLBASELL).

The surface layer also contains slip agents that reduce the coefficient of friction of the metalloplastic strip. It may also include optional additives such as anti-blocking agents used as additives to improve the formability of the metalloplastic complex, particularly by reducing the relative friction between the coating and shaping tools.

A slip agent means an additive to reduce the coefficient of friction. The coefficient of friction is a value that gives an idea of the force necessary to displace an object on a plane surface. Friction increases as the value of the coefficient of friction increases. The coefficient is measured using an Altek 9505A tribometer made by the Alek company.

Examples of slip agents to improve the formability of the metalloplastic complex include polysiloxanes, typically polydimethylsiloxanes (PDMS) with a high molecular weight used alone or in mixtures and marketed under references MB 50-001 (MULTIBASE) or POLYBATCH® ILPE 10020 and IL 100200 SC (A. Schulman), among others.

Preferably, the slip agent is used with a content of between 2 and 20% by weight of the composition of the surface layer. Even more advantageously, the slip agent is composed of a mix of 10% by weight of 50-001 and 6% by weight of MM Polybatch ILPE 10020 the % by weight being expressed relative to the composition of the surface layer.

The surface layer applied to the inside face of the rigid food packaging can give a surface with the container that does not have the disadvantages of varnishes in terms of health safety or characteristics that could be harmful to products.

Rigid food packagings according to the invention are obtained by stamping a metalloplastic strip like that described above (FIGS. 2 and 3), the face comprising adhesion and surface layers forming the inside face of food packagings.

For the purposes of this invention, the outside face means the face of the rigid packaging in contact with the exterior, and the inside face means the internal face of the rigid packaging in contact with the content of the packaging.

Details of the invention will be better understood after studying the following examples, that are not in any way limitative.

EXAMPLES

Measurements

The coefficient is measured using an Altek 9505A tribometer.

The coefficient of friction is equal to the ratio of the traction force and the weight of the mobile necessary to maintain movement along the direction of rolling.

The tribometer consists of a horizontal tray on which a sample of the metalloplastic strip is placed. A 2 kg mobile supported on three 16 mm diameter steel balls is put into position on the surface of the sample. The mobile is connected through a cable to a pressure sensor that measures friction forces that oppose displacement of the mobile. The ratio of the measured friction force/weight of the mobile (2 kg) determines the value of the coefficient of friction.

Figure 5:
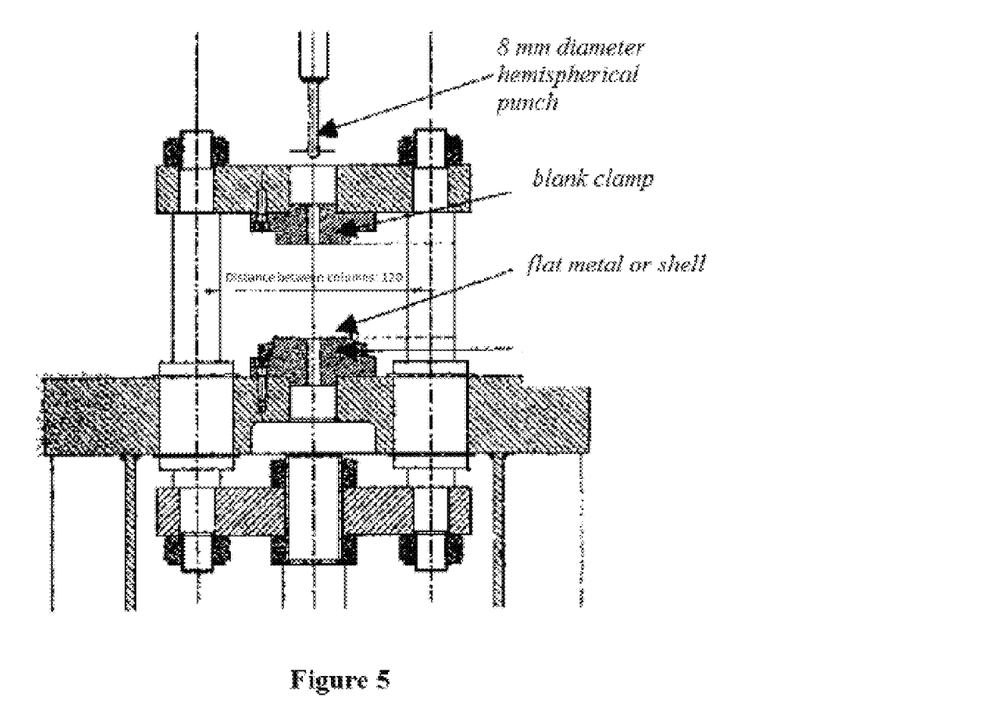
FIG. 5 represents a diagram of the hemispherical expansion test device.

Formability is determined by the Aquila test (FIG. 5). This is a hemispherical expansion test that measures the biaxial expansion characteristics of a strip for lids.

The Aquila test measures the depth of stamping by a hemispherical punch at the time that the metal rupture is observed.

This test consist includes the following steps:
 put the metalloplastic strip into position between an 8.8 mm die and the blank clamp.
 indent the metalloplastic strip at constant velocity using an 8 mm diameter hemispherical punch.

The force and the travel distance are recorded continuously and measured at perforation of the strip and are then compared with different metal references with a given thickness.

Manufactured lids are also characterized in terms of porosity and openness of the incision.

The porosity test is made from a copper sulfate solution and is used to detect the presence of porosity of the varnish on the incisions in beverage can lids. This test is made on a sample of 10 lids for each reference The porosity test consists of the following steps:
 prepare a solution of copper sulfate comprising 50 g of copper sulfate in the form of crystals dissolved in 950 g of demineralized water and add 20 ml of hydrochloric acid at 36 M to the solution and then
 stir using a stirrer,
 put the lids flat in a bowl, with their inside face upwards and without any prior preparation such as degreasing or rinsing.
 fill the recess of each lid with a copper sulfate solution.
 examine the lid after 15 minutes' immersion, the examination consisting or recording the number of pits and bubbles formed and their location along the incision and on preferred sites on each lid.

Example 1

Example 1 is made according to the conditions of the invention. The metalloplastic strip obtained by coating with an adhesion layer and a surface layer, by co-extrusion on the two faces of a 220 μm thick AA5182 alloy in the H39 metallurgical temper.

Composition of the adhesion layer: OREVAC 18751 (ARKEMA)

Composition of the Surface Layer:

| Composition of the | % by weight |
| --- | --- |
| WF420 HMS (Borealis) | As required 100% |
| ILPE 10020 (A. SCHULMAN) | 6% |
| PDMS MB-50-001 (MULTIBASE) | 10% |

The metalloplastic strip is obtained by:
 The use of AA5182 aluminum alloy reels with a 220 μm thick 800 mm wide strip in the H39 temper with a total weight of 2000 kg;
 preheat the strip using an infrared source at a temperature of 40 to 45° C. before coating by co-extrusion;
 spreading of an OREVAC 18751 adhesion layer by co-extrusion at a temperature of about 270° C. to coat the two faces of the metallic strip;
 calender the coated metallic strip, the total thickness of each adhesion layer is between 8 and 12 μm.
 heat treatment in an infrared oven with a nominal power of 45 kW with a residence time of 7.5 s at an air temperature of 170° C. and a strip temperature at the exit equal to between 130 and 140° C.,
 cooling by quenching in a water bath at 25° C. The total thickness of the coating is exactly the same on the two faces of the metalloplastic strip. The applied coating layer is 11 g/m² on each face.

The coefficient of friction is 0.06 (Altek 9505A) and the metallurgical temper is H48.

The metallic strip thus obtained was used on a pilot industrial installation for the fabrication of beverage can lids by stamping.

Figure 1:
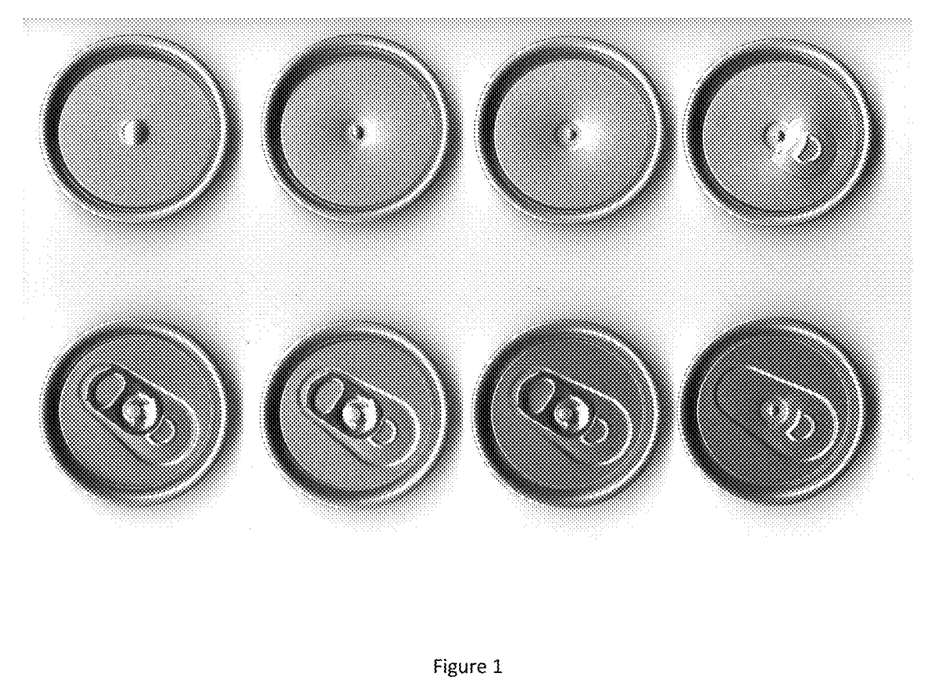
FIG. 1 represents a beverage can lid during the different shaping steps.

Formatting tools were adjusted to obtain a bulb height equal to 1.90 mm at the end of the first lid manufacturing pass (FIG. 1).

Use of the metalloplastic has made it possible to make 400 lids on the press continuously (stamping rate 100 strokes/min.) and did not cause any operating problems, or observable fault on finished lids. The strips obtained according to the invention are conforming, particularly concerning performances measured on lids made on a pilot line at the industrial scale, both for the blank press, for manufacturing a preform, for the conversion press, forming of the panel with the incision, the rivet, and the addition of a ring for the opening that is then riveted onto the lid, as shown on FIG. 1, and more particularly the dimensions of the parts obtained and their conformity with geometric tolerances imposed by customers.

The lids formed are also free of typical defects such as cracks in rivets, corrosion under the incision, providing quality conforming with customers' requirements.

The robustness of the method according to the invention in an industrial context has been demonstrated by manufacturing a number of lids free of defects during fabrication in series at more than 100 strokes/minute on presses, specific and quite positive behavior, particularly related to adhesion of the coating, resistance to sterilization or pasteurization of the packaging, porosity of the coating and rupture of the polymer film along the incision when the lid is opened, are also obtained.

Strips according to the invention can be used for continuous manufacturing of metalloplastic lids on industrial presses by co-extrusion of PP on an aluminum alloy substrate without the use of external lubrication.

COMPARATIVE EXAMPLES

Complementary tests were carried out following the protocol in example 1.

When there is no slip agent in the surface layer, the Altek coefficient is −0.230 and the beverage lid cannot be satisfactorily shaped.

In the presence of 0.2% of slip agent in the surface layer, the Altek coefficient is −0.090 and the beverage can lid cannot be satisfactorily shaped.

In a third test made using the protocol defined in example 1 and for which the metalloplastic strip obtained is in the H39 metallurgical temper, the Altek coefficient obtained is 0.90 and the beverage can lid cannot be satisfactorily shaped.

REFERENCES

1. Environ Health Perspect., June 1995; 103(6): 608-612.
2. Journal of Chromatography A, Volume 1444, 29 April 2016, Pages 106-113
3. Trends in Analytical Chemistry, Volume 42, January 2013, Pages 99-124
4. Canmaking The Technology of Metal Protection and Decoration, T. A. Turner, 1998, ISBN: 978-1-4419-4743-7, pp 129-130
5. http://www.toyo-seikan.co.jp/e/product/for-beverage/can/atulc.html
6. Association for the development of anodized or lacquered aluminum (adal) Lacquer Vade-mecum, Chap. 4, http://www.aluminium.fr/wp-content/uploads/2013/10/vade-mecum_language.pdf

The invention claimed is:

1. A method for coating a substrate made of an aluminum alloy in the AA3000 or AA5000 series in an H19 or H39 metallurgical temper with a thickness of between 150 and 270 pm, comprising: a) coating by extrusion or co-extrusion at a temperature between 250 and 280° C. of a polypropylene modified by maleic anhydride adhesion layer on each face of said aluminum alloy substrate, and a surface layer made of polypropylene comprising at least one slip agent covering at least one of said adhesion layers so as to form a metalloplastic strip; b) calendering of said metalloplastic strip to obtain a total thickness of the set of adhesion and surface layers being between 4 and 20 pm per face; c) heat treatment of said metalloplastic strip with a strip temperature comprised between 120 and 160° C. for 1 to less than 20 seconds; d) cooling of the metalloplastic strip, to obtain an H48 metallurgical temper and a coefficient of friction of 0.06 or less, wherein a heat treatment of the aluminum alloy substrate or a preheating of said aluminum alloy substrate at a temperature between 40 and 70° C. is done before the coating step.

2. The method for coating according to claim 1, wherein the aluminum alloy substrate is selected from the group consisting of AA5042, AA5052, AA5182, AA5006, AA3004, AA3005, AA3104 and AA3207.

3. The method for coating according to claim 1, wherein the surface layer is applied on the two faces of the metalloplastic strip.

4. The method for coating according to claim 1, wherein that the surface layer comprises at least one anti-blocking agent selected from the group consisting of silica, talc and aluminum silicates or combinations thereof.

5. The method for coating according to claim 4, wherein the anti-blocking agent is silica with a content of between 0.5 and 2% by weight of the composition of the surface layer.

6. The method for coating according to claim 1, wherein the at least one slip agent is a polysiloxane.

7. The method for coating according to claim 1, wherein it comprises a prior surface treatment of the aluminum alloy substrate before the coating step.

8. The method for coating according to claim 1, wherein the thickness of the set of adhesion and surface layers of an external face is from 5 to 10 μm.

9. The method for coating according to claim 1, wherein the thickness of the set of adhesion and surface layers of an internal face is from 5 to 15 μm.

10. The method for coating according to claim 1, wherein the at least one slip agent is polydimethylsiloxane.

11. The method for coating according to claim 7, wherein the prior surface treatment of the aluminum alloy substrate comprises acid degreasing and/or phosphoric anodization and/or chemical conversion.

12. The method for coating according to claim 1, wherein the substrate made of an aluminum alloy in the AA3000 or AA5000 series has a thickness of between 200 and 230 μm.

13. The method for coating according to claim 1, wherein the at least one slip agent with a content of between 2-20% by weight of the composition of the surface layer.

14. The method for coating according to claim 1, wherein the metalloplastic strip is cooled by quenching in a water bath.

15. The method for coating according to claim 1, rein step c) comprises a heat treatment of said metalloplastic strip with a strip temperature comprised between 130 and 140° C.

16. The method for coating according to claim 1, wherein step c) comprises a heat treatment of said metalloplastic strip with a strip temperature comprised between 120 and 160° C. for 1 to 7.5 seconds.

17. A rigid food packaging element made from a rolled metalloplastic strip obtained according to claim 1.

18. The rigid food packaging element according to claim 17 wherein the rigid food packaging element is a rigid food packaging lid.

19. The rigid food packaging lid according to claim 18 wherein the rigid food packaging element is a beverage can.

\* \* \* \* \*